(12) United States Patent
Takamatsu et al.

(10) Patent No.: US 11,593,635 B2
(45) Date of Patent: Feb. 28, 2023

(54) INFORMATION PROCESSING DEVICE, METHOD OF PROCESSING INFORMATION, AND METHOD OF PROVIDING INFORMATION

(71) Applicant: SONY CORPORATION, Tokyo (JP)

(72) Inventors: Shingo Takamatsu, Tokyo (JP); Akira Fukui, Kanagawa (JP); Naoki Ide, Tokyo (JP); Yukio Oobuchi, Kanagawa (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1031 days.

(21) Appl. No.: 16/076,396

(22) PCT Filed: Jan. 10, 2017

(86) PCT No.: PCT/JP2017/000441
§ 371 (c)(1),
(2) Date: Aug. 8, 2018

(87) PCT Pub. No.: WO2017/175434
PCT Pub. Date: Oct. 12, 2017

(65) Prior Publication Data
US 2019/0050730 A1   Feb. 14, 2019

(30) Foreign Application Priority Data
Apr. 6, 2016 (JP) .............................. JP2016-076340

(51) Int. Cl.
*G06N 3/08* (2006.01)
*G06F 16/00* (2019.01)
(Continued)

(52) U.S. Cl.
CPC ............... *G06N 3/08* (2013.01); *G06F 16/00* (2019.01); *G06F 16/583* (2019.01); *G06F 16/955* (2019.01); *G06F 17/18* (2013.01)

(58) Field of Classification Search
CPC ....... G06N 3/08; G06F 16/583; G06F 16/955; G06F 16/00; G06F 17/18
See application file for complete search history.

(56) References Cited

U.S. PATENT DOCUMENTS

| | | | |
|---|---|---|---|
| 5,598,509 A * | 1/1997 | Takahashi | G06K 9/62 706/20 |
| 8,712,930 B1 * | 4/2014 | Covell | G06F 16/583 706/12 |

(Continued)

OTHER PUBLICATIONS

Smith et al., Recommending Learning Algorithms and Their Associated Hyperparameters, arXiv.org, Jul. 7, 2014, pp. 1-2.

*Primary Examiner* — Alexander Satanovsky
*Assistant Examiner* — Lyudmila Zaykova-Feldman
(74) *Attorney, Agent, or Firm* — Paratus Law Group, PLLC

(57) ABSTRACT

There is provide an information processing device capable of reducing the time taken for selection of the learning setting, the information processing device including: a data acquisition unit configured to acquire a learning setting corresponding to information related to previous learning processing in which a degree of similarity with information related to learning processing specified by a user is higher than a predetermined degree of similarity as a learning setting to be recommended to the user; and a display control unit configured to control display corresponding to the learning setting to be recommended.

21 Claims, 11 Drawing Sheets

(51) Int. Cl.
*G06F 16/583* (2019.01)
*G06F 16/955* (2019.01)
*G06F 17/18* (2006.01)

(56) References Cited

U.S. PATENT DOCUMENTS

| | | | | |
|---|---|---|---|---|
| 2005/0283450 | A1* | 12/2005 | Matsugu | G06N 3/049 |
| | | | | 706/20 |
| 2007/0186267 | A1* | 8/2007 | Ohde | H04N 21/44222 |
| | | | | 725/135 |
| 2010/0023465 | A1* | 1/2010 | Kuroiwa | G06N 20/00 |
| | | | | 706/47 |
| 2012/0101965 | A1* | 4/2012 | Hennig | G06N 20/00 |
| | | | | 706/46 |
| 2012/0158623 | A1* | 6/2012 | Bilenko | G06N 20/00 |
| | | | | 706/12 |
| 2013/0236072 | A1* | 9/2013 | Sun | G06V 40/175 |
| | | | | 382/118 |
| 2015/0363670 | A1* | 12/2015 | Sugishita | G06V 10/96 |
| | | | | 382/218 |
| 2016/0125273 | A1* | 5/2016 | Matsunaga | G06K 9/6234 |
| | | | | 382/159 |
| 2016/0162478 | A1* | 6/2016 | Blassin | G06Q 10/063112 |
| | | | | 706/12 |
| 2019/0164109 | A1* | 5/2019 | Suhara | G06Q 30/06 |

\* cited by examiner

FIG. 7

| | | | G40 |
|---|---|---|---|
| RECOMMENDATION RESULT OF LEARNING SETTING ||||
| LEARNING SETTING | DEGREE OF ACCURACY | DEGREE OF SIMILARITY BETWEEN DATA SETS ||
| | 90% | 5.43 ||
| | 88% | 5.43 ||
| | 87% | 4.11 ||

INFORMATION PROCESSING DEVICE, METHOD OF PROCESSING INFORMATION, AND METHOD OF PROVIDING INFORMATION

CROSS REFERENCE TO PRIOR APPLICATION

This application is a National Stage Patent Application of PCT International Patent Application No. PCT/JP2017/000441 (filed on Jan. 10, 2017) under 35 U.S.C. § 371, which claims priority to Japanese Patent Application No. 2016-076340 (filed on Apr. 6, 2016), which are all hereby incorporated by reference in their entirety.

TECHNICAL FIELD

The present disclosure relates to an information processing device, a method of processing information, and a method of providing information.

BACKGROUND ART

In recent years, there are various technologies as a technique relating to learning using a neural network (e.g., see Patent Literature 1). The neural network is roughly divided into three layers (input, intermediate, and output layers). Learning using a network having a plurality of intermediate layers among them is called deep learning.

CITATION LIST

Patent Literature

Patent Literature 1: JP H5-135000A

DISCLOSURE OF INVENTION

Technical Problem

Here, in deep learning, selection of a learning setting is important. However, it is typically necessary to execute learning processing that takes a long time to obtain an index used to select a learning setting. Thus, it is desirable to provide a technique capable of reducing the time taken for selection of the learning setting.

Solution to Problem

According to the present disclosure, there is provided an information processing device including: a data acquisition unit configured to acquire a learning setting corresponding to information related to previous learning processing in which a degree of similarity with information related to learning processing specified by a user is higher than a predetermined degree of similarity as a learning setting to be recommended to the user; and a display control unit configured to control display corresponding to the learning setting to be recommended.

According to the present disclosure, there is provided a method of processing information, the method including: acquiring a learning setting corresponding to information related to previous learning processing in which a degree of similarity with information related to learning processing specified by a user is higher than a predetermined degree of similarity as a learning setting to be recommended to the user; and controlling, by a processor, display corresponding to the learning setting to be recommended.

According to the present disclosure, there is provided a method of providing information, the method including: searching for a learning setting corresponding to information related to previous learning processing in which a degree of similarity with information related to learning processing specified by a user is higher than a predetermined degree of similarity as a learning setting to be recommended to the user; and controlling, by a processor, transmission of the learning setting to be recommended.

Advantageous Effects of Invention

According to the embodiment of the present disclosure as described above, there is provided a technique capable of reducing the time taken for selection of an appropriate learning setting. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a diagram illustrating another example of the display screen of learning setting to be recommended.

MODES FOR CARRYING OUT THE INVENTION

Figure 1:
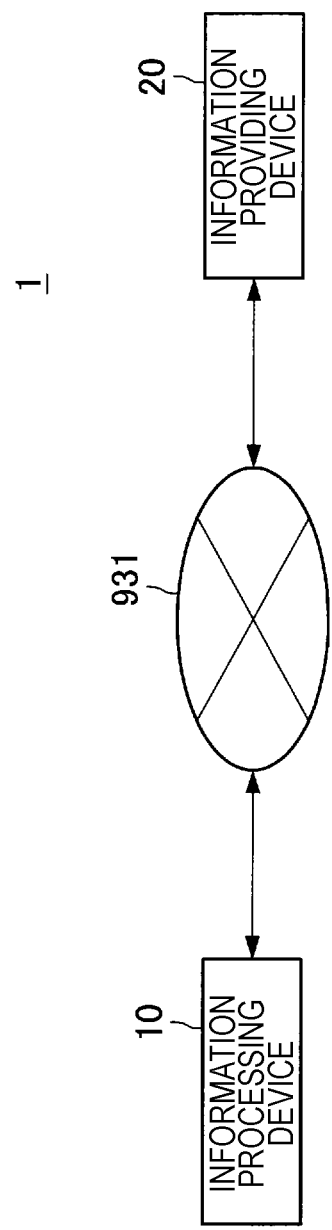
FIG. 1 is a diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different numerals after the same reference sign. However, when there is no need in particular to distinguish structural elements that have substantially the same function and structure, the same reference sign alone is attached.

Moreover, the description will be given in the following order.

0. Background
1. Embodiment of present disclosure
1.1. System configuration example
1.2. Functional configuration example
1.3. Details of functions of information processing system
1.4. Hardware configuration example
2. Conclusion

0. BACKGROUND

There are various technologies as a technique relating to learning using a neural network (e.g., see JP 1-15-135000A). The neural network is roughly divided into three layers (input, intermediate, and output layers). Learning using a network having a plurality of intermediate layers among them is called deep learning.

In deep learning, selection of a learning setting is important. However, it is typically necessary to execute learning processing that takes a long time to obtain an index used to select a learning setting. Thus, this specification will mainly describe a technique capable of reducing the time taken for selection of a learning setting. Moreover, this specification is based on the assumption that the deep learning is mainly used as learning, but the form of learning is not limited to the deep learning.

1. EMBODIMENT OF PRESENT DISCLOSURE

1.1. System Configuration Example

A configuration example of an information processing system according to an embodiment of the present disclosure is now described with reference to the drawings. FIG. 1 is a diagram illustrating a configuration example of the information processing system according to an embodiment of the present disclosure. As illustrated in FIG. 1, the information processing system 1 according to the present embodiment includes an information processing device 10 and an information providing device 20. The information processing device 10 and the information providing device 20 are capable of communicating with each other via a communication network 931.

This specification describes an example in which the information providing device 20 provides the information processing device 10 with a cloud service of learning processing. In this cloud service, it is possible to perform the execution of learning processing and acquisition of the resultant learning result from the browser displayed by the information processing device 10. However, the present embodiment is not limited to this example. In one example, the cloud service provided to the information processing device 10 by the information providing device 20 can be performed by the information processing device 10 itself instead of the information providing device 20.

The learning processing is performed by selecting a data set and a learning setting and by executing a parameter optimization algorithm for the data set and the learning setting. The learning result includes a learning setting and an optimized parameter. In addition, the learning setting includes a network structure. In addition, as described below, the learning setting can also include optimization algorithm, error function, regularization, number of mini-batches, input data preprocessing, and the like.

Moreover, in the following description, "hyperparameter" indicates a parameter selected before execution of the optimization algorithm, and "parameter" indicates a parameter optimized by the optimization algorithm, which are held in each layer of a network.

The network structure includes a graph structure indicating a connection relationship of each layer that constitutes a network, the type of each layer that constitutes a network, the shape of output from each layer, a hyperparameter of each layer, and the like. Here, the graph structure indicating the connection relationship of each layer corresponds to a graph structure in which a layer (an affine layer, etc.) is set to an edge and a group of numerical values e.g., a vector, a tensor, etc.) serving as inputs or outputs to or from a layer is set to a node.

An example of the type of each layer includes a maxout layer. An example of the maxout layer includes a 50-dimensional vector as an example of the shape of an output, and an example of the hyperparameter includes the number of values taking max in each dimension of an output.

The optimization algorithm includes the type of optimization algorithm and a hyperparameter. An example of an optimization algorithm includes AdaGrad. An example of a hyperparameter of the optimization algorithm includes a learning coefficient.

The error function includes the type of error function and a hyperparameter. An example of the type of error function includes a square error.

The regularization includes the type of regularization and a hyperparameter. An example of the type of regularization is L1 regularization. An example of the hyperparameter of regularization includes the coefficient of a regularization term.

The number of mini-batches corresponds to the number of data used in one mini-batch in a case where mini-batch learning is performed by optimization.

The input data preprocessing includes the type of input data preprocessing and a hyperparameter. An example of the type of input data preprocessing includes regularization processing, pre-learning by auto encoder, and the like.

In this specification, it is considered that a plurality of users use the cloud service described above and a search history of a learning setting is shared among the plurality of users. The search history is a set of search history trees. In addition, the search history tree is a set of the same data set ID and various kinds of information corresponding thereto (e.g., learning setting, performance of learning setting obtained by optimization algorithm, execution time of optimization algorithm, and learning setting of the most recently executed optimization algorithm, etc.).

This specification will mainly describe a case where prediction accuracy is used as the performance of a learning setting. There may be a case where a data set for parameter training (for learning) and a data set for evaluation are provided as a data set. In this case, the prediction accuracy can be an average value obtained by executing learning processing using the data set for parameter training, then calculating a value of error function by using the data set for evaluation and averaging values of error function calculated by each data sample. The performance of the learning setting is however not limited to the prediction accuracy.

The performance of the learning setting can be the number of parameters included in the learning setting (the smaller the number of parameters, the higher the performance), or can be computational complexity from input to output in a network structure (the smaller the computational complexity, the higher the performance). Alternatively, the performance of the learning setting can be the size of memory used from input to output in the network structure (the smaller the size of memory, the higher the performance). Alternatively, the performance of the learning setting can be any combination of prediction accuracy, number of parameters, computational complexity, and size of memory.

In the present embodiment, the search history is accumulated in the cloud service. The search history can include the search history of learning settings. In addition, the search history can include a search history obtained by the learning processing executed on the basis of the user's own operation and a search history obtained by the learning processing executed on the basis of the other user's operations. The user specifies a data set corresponding to a problem to be solved. Then, when the user specifies a learning setting, recommendation of the learning setting is given to the user on the basis of the search history.

Moreover, the form of the information processing device 10 is not limited to a particular form. In one example, the information processing device 10 may be a game console, a smartphone, a mobile phone, a tablet terminal, and a personal computer (PC). In addition, the information providing device 20 is assumed to be a computer such as a server.

The configuration example of the information processing system 1 according to the present embodiment is described above.

1.2. Functional Configuration Example

Figure 2:
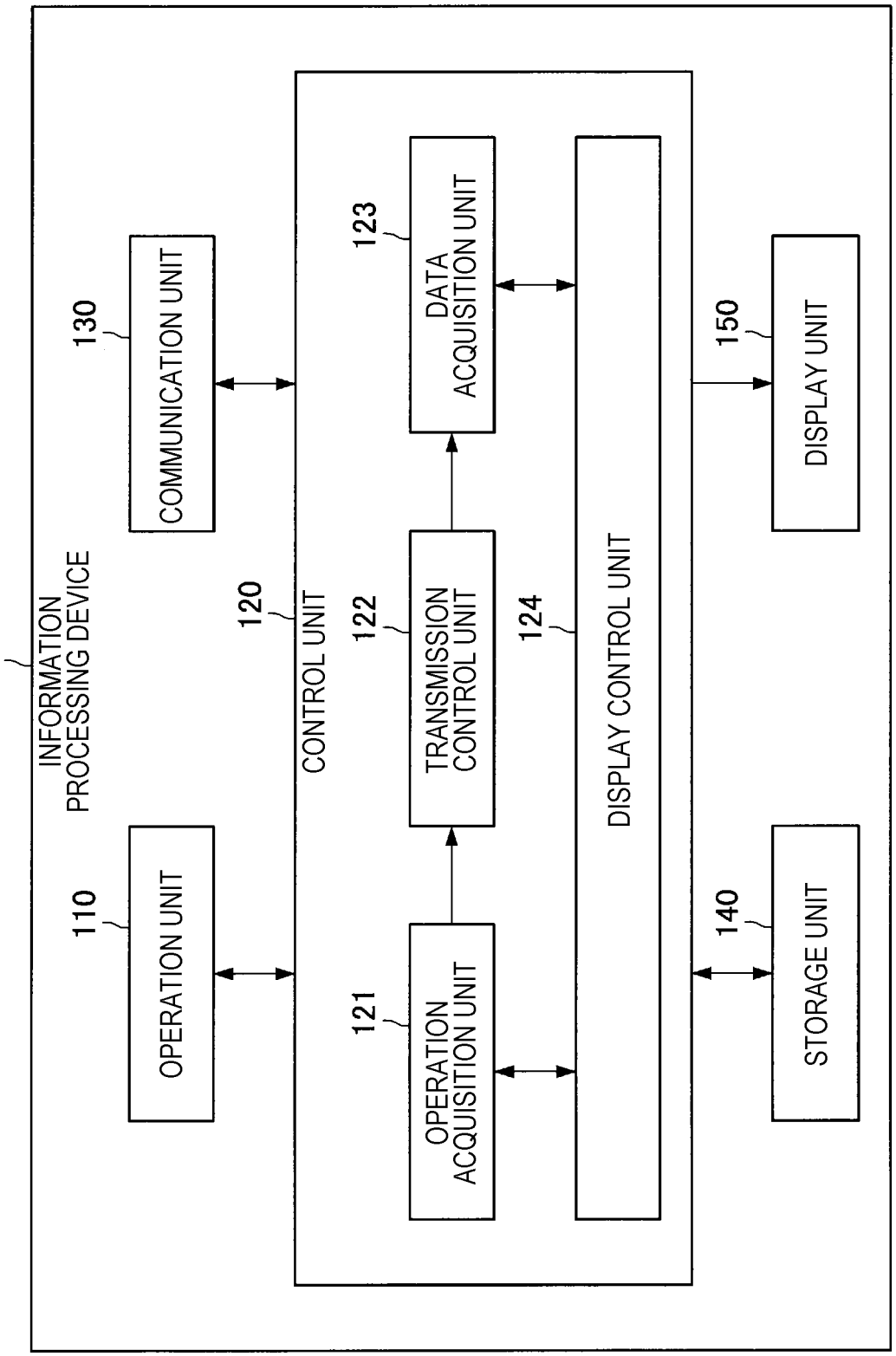
FIG. 2 is a block diagram illustrating a functional configuration example of an information processing device according to the present embodiment.

Subsequently, a functional configuration example of the information processing device 10 according to the present embodiment is described. FIG. 2 is a block diagram illustrating a functional configuration example of the information processing device 10 according to the present embodiment. As illustrated in FIG. 2, the information processing device 10 includes an operation unit 110, a control unit 120, a communication unit 130, a storage unit 140, and a display unit 150. These functional blocks included in the information processing device 10 are described below.

The operation unit 110 has a function of receiving a user's operation. In one example, the operation unit 110 may include an input device such as a mouse and a keyboard. In addition, the operation unit 110 may include a touch panel as long as it has a function of receiving the user's operation. A type of the touch panel to be employed is not limited to a particular type, and may be an electrostatic capacitive, resistive-film, infrared, or ultrasonic type. In addition, the operation unit 110 may include a camera.

The control unit 120 controls the respective units included in the information processing device 10. As illustrated in FIG. 2, the control unit 120 includes an operation acquisition unit 121, a transmission control unit 122, a data acquisition unit 123, and a display control unit 124. Details of these functional blocks equipped in the control unit 120 will be described later. Moreover, the control unit 120 may include, in one example, a central processing unit (CPU), or the like. In the case where the control unit 120 includes a processing device such as a CPU, such a processing device may include an electronic circuit.

The communication unit 130 has a function of communicating with the information providing device 20. In one example, the communication unit 130 includes a communication interface. In one example, the communication unit 130 is capable of communicating with the information providing device 20 via the communication network 931 (FIG. 1).

The storage unit 140 is a recording medium that stores a program to be executed by the control unit 120 and stores data necessary for execution of the program. In addition, the storage unit 140 temporarily stores data for computation h the control unit 120. The storage unit 140 may be a magnetic storage unit device, a semiconductor storage device, an optical storage device, or a magneto-optical storage device.

The display unit 150 has a function of displaying various types of information. In one example, the display unit 150 may be a liquid crystal display, an organic electro-luminescence (EL) display, or a head-mounted display (HMD). However, the display unit 150 may be other forms of display as long as it has the function of displaying various types of information.

The functional configuration example of the information processing device 10 according to the present embodiment is described above.

Figure 3:
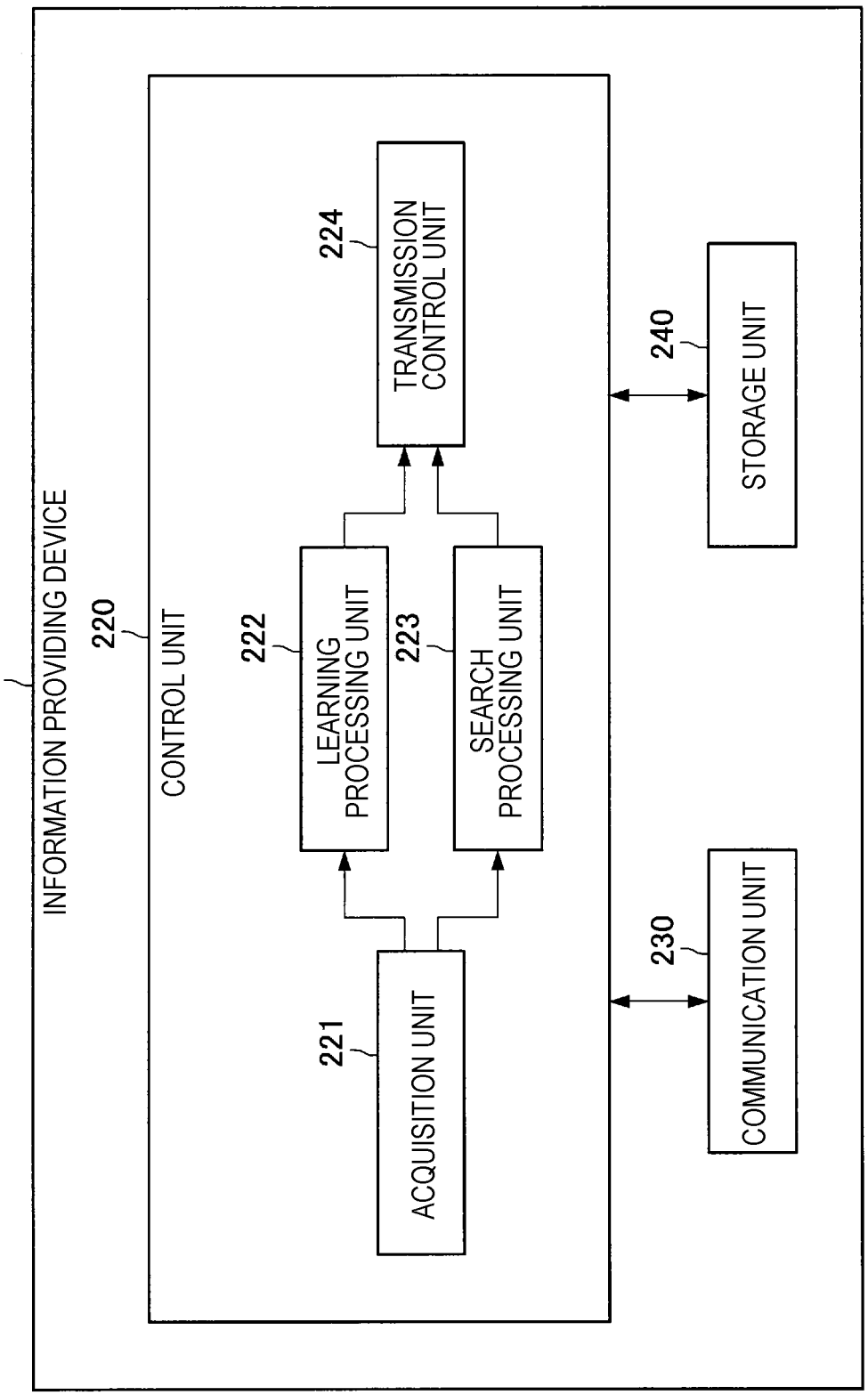
FIG. 3 is a block diagram illustrating a functional configuration example of an information providing device according to the present embodiment.

Subsequently, the functional configuration example of the information providing device 20 according to the present embodiment is described. FIG. 3 is a block diagram illustrating the functional configuration example of the information providing device 20 according to the present embodiment. As illustrated in FIG. 3, the information providing device 20 includes a control unit 220, a communication unit 230, and a storage unit 240. These functional blocks included in the information providing device 20 are described below.

The control unit 220 controls the respective units included in the information providing device 20. As illustrated in FIG. 3, the control unit 220 includes an acquisition unit 221, a learning processing unit 222, a search processing unit 223, and a transmission control unit 224. Details of these functional blocks equipped in the control unit 220 will be described later. Moreover, the control unit 220 may include, in one example, a central processing unit (CPU), or the like. In the case where the control unit 220 includes a processing device such as a CPU, such a processing device may include an electronic circuit.

The communication unit 230 has a function of communicating with the information processing device 10. In one example, the communication unit 230 includes a communication interface. In one example, the communication unit 230 is capable of communicating with the information processing device 10 via the communication network 931 (FIG. 1).

The storage unit 240 is a recording medium that stores a program to be executed by the control unit 220 and stores data necessary for execution of the program. In addition, the storage unit 240 temporarily stores data for computation by the control unit 220. The storage unit 240 may be a magnetic storage unit device, a semiconductor storage device, an optical storage device, or a magneto-optical storage device.

The functional configuration example of the information providing device 20 according to the present embodiment is described above.

1.3. Details of Functions of Information Processing System

Figure 4:
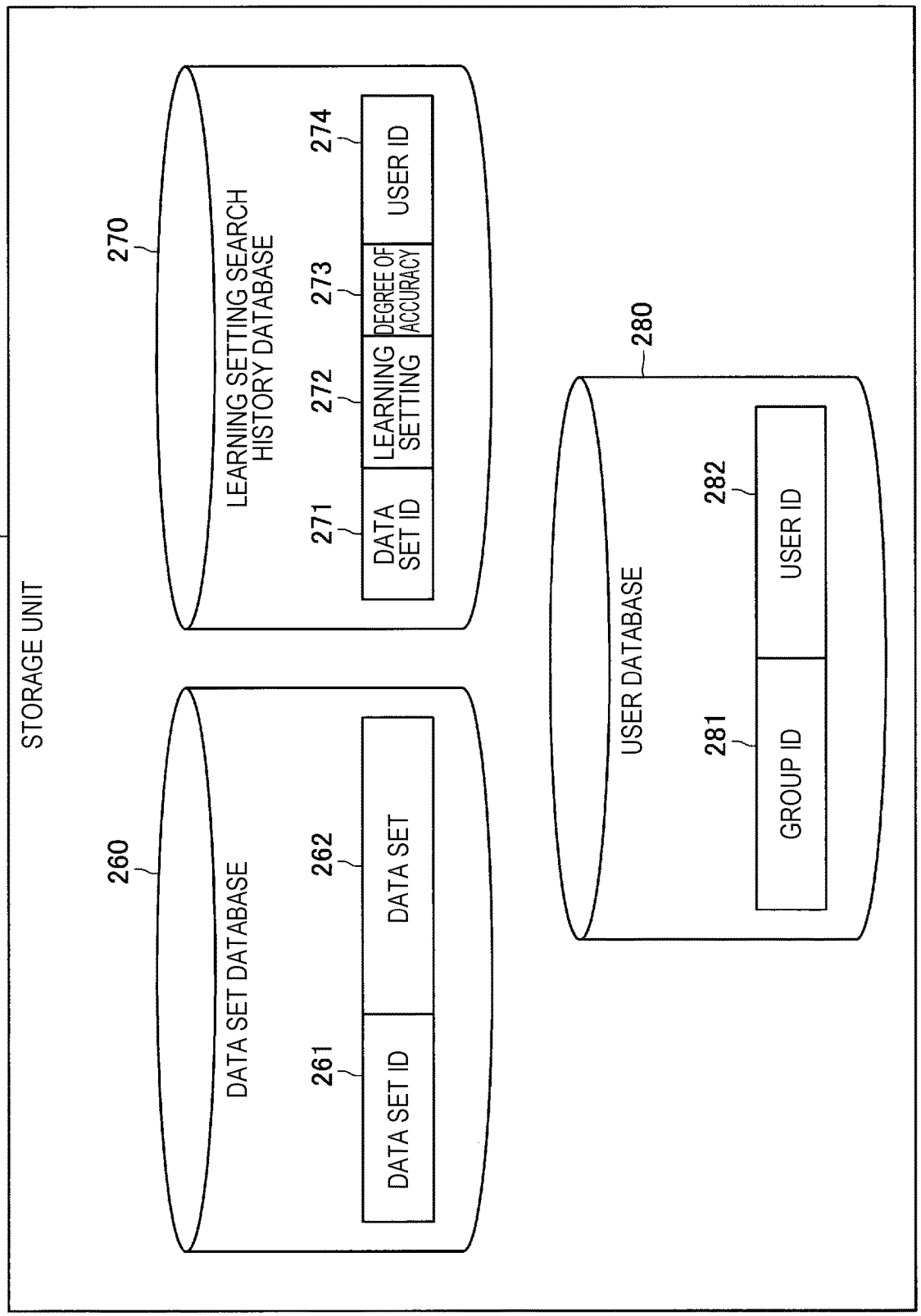
FIG. 4 is a diagram illustrating an example of a database stored in a storage unit of an information providing device.

The functions of the information processing system 1 are now described in detail. FIG. 4 is a diagram illustrating an example of a database stored in the storage unit 240 of the information providing device 20. As illustrated in FIG. 4, the storage unit 240 includes a data set database 260 and a learning setting search history database 270. In addition, a user database 280 is stored in the storage unit 240.

The data set database 260 stores information in which a data set ID 261 and a data set 262 are associated with each other. In addition, the learning setting search history database 270 stores information in which a data set ID 271, a learning setting 272, a degree of accuracy 273, and a user ID 274 are associated with each other. The user database 280 stores information in which a group ID 281 and a user ID 282 are associated with each other.

The user is necessary to register a user's own ID and an ID of a group to which the user belongs in the user database 280. In other words, information in which the user's own ID and the group ID of the group to which the user belongs are associated with each other is stored in the user database 280. The user ID may be any information that can uniquely identify users, and may be a user's account or the like. In addition, information indicating relationship with other users may be additionally registered in the user database 280.

The data set is necessary to execute the learning processing. Thus, the user specifies a data set to be used for the learning processing in executing the learning processing. When the data set specified by the user is uploaded to the information providing device 20, it is stored as the data set 262 in association with the data set ID 261. In addition, the learning setting is necessary to execute the learning processing. Thus, the user specifies a learning setting in executing the learning processing. The learning setting specified by the user is uploaded to the information providing device 20.

In the information providing device 20, the learning processing is executed by the learning processing unit 222 on the basis of the data set and the learning setting that are specified by the user. In addition, in the information providing device 20, the learning processing is executed, and then the degree of accuracy of the learning setting obtained by the learning processing is calculated. The data set ID, the learning setting, the degree of accuracy, and the user ID obtained by the learning processing are stored as the data set ID 271, the learning setting 272, the degree of accuracy 273, and the user ID 274, respectively. In the information providing device 20, the learning setting is recommended to the user by using various kinds of information stored in these databases.

The present embodiment is applicable in any case. In one example, the present embodiment is applicable to a case where a user registers a data set for image classification in the information providing device 20 and causes the information providing device 20 to execute learning processing to solve a image classification problem. In one example, it is assumed that identification of whether a component is defective at a component factory is performed through image classification. In such a case, the data set includes photographs of a plurality of components and a label indicating whether each photograph is a defective component. The use of a learning result obtained from the cloud service using this data set makes it possible to predict whether a component is defective from the image of the component in the factory line.

Specifically, in the present embodiment, when the user performs an operation of specifying information related to the learning processing, such an operation is acquired by the operation acquisition unit 121. The information related to the learning processing specified by the user is controlled to be transmitted to the information providing device 20 by the transmission control unit 122. In the information providing device 20, the acquisition unit 221 acquires the information related to the learning processing, and the search processing unit 223 searches for a learning setting corresponding to information related to the previous learning processing in which a degree of similarity with the information related to the learning processing is higher than a predetermined degree of similarity.

The transmission control unit 224 controls transmission of the learning setting obtained by the search processing unit 223 to the information processing device 10. In the information processing device 10, when the learning setting is received by the communication unit 130, the data acquisition unit 123 acquires the learning setting received by the communication unit 130 as the learning setting to be recommended to the user. Then, the display control unit 124 controls display corresponding to the learning setting to be recommended. Such a configuration makes it possible to reduce the time taken for selection of the learning setting.

Figure 5:
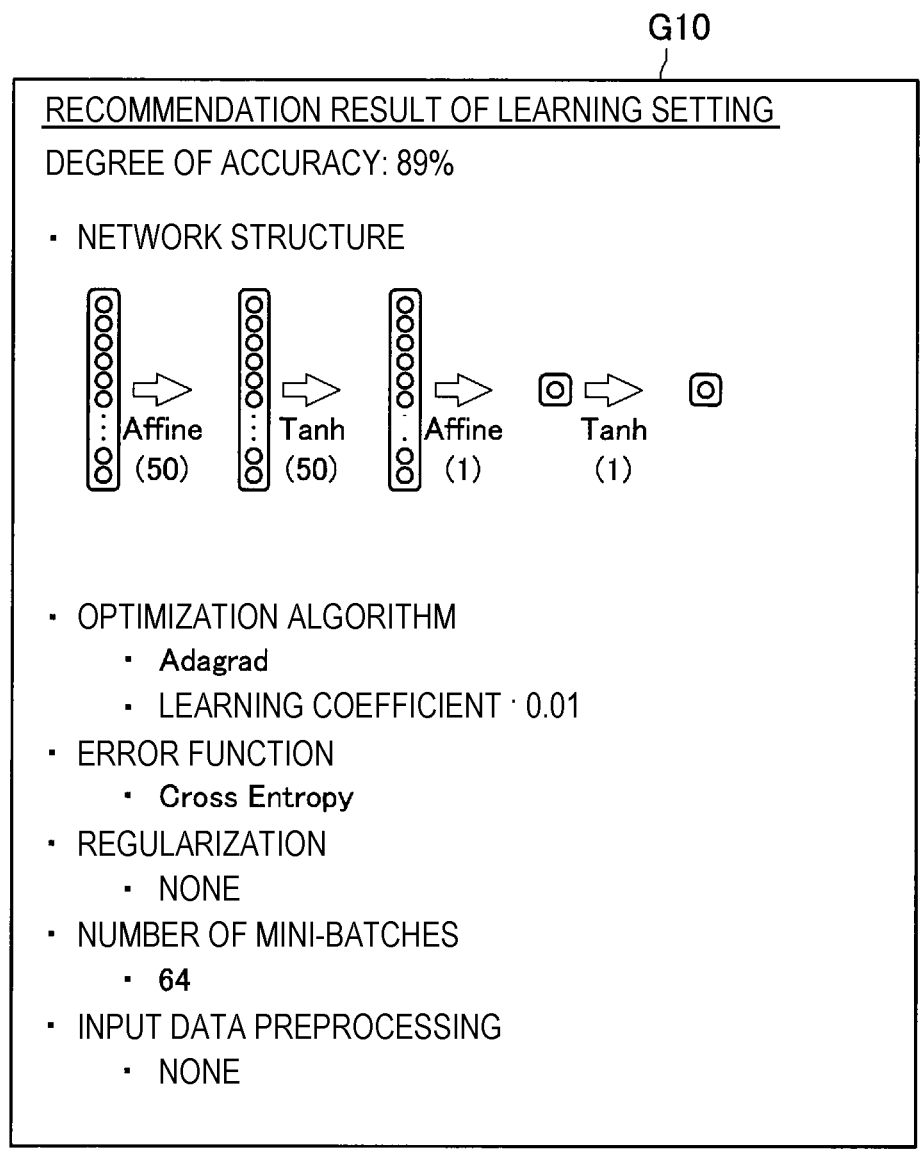
FIG. 5 is a diagram illustrating an example of a display screen of learning setting to be recommended.

In this event, the data acquisition unit 123 can acquire the degree of accuracy of the learning setting to be recommended from the search history, and the display control unit 124 can control display of the degree of accuracy. FIG. 5 is a diagram illustrating an example of a display screen of learning setting to be recommended. Referring to FIG. 5, a learning setting display screen G10 whose display is controlled by the display control unit 124 includes the learning setting to be recommended (network structure, optimization algorithm, error function, regularization, number of mini-batches, and input data preprocessing in the example illustrated in FIG. 5) and the degree of accuracy of the learning setting to be recommended.

Here, the information related to the learning processing specified by the user and the specific contents of the search history are not limited. As a first example, the information related to the learning processing specified by the user includes a data set specified by the user, and the information related to the previous learning processing can include the data set used for the previous learning processing. In addition, as a second example, the information related to the learning processing can include a learning setting specified by the user, and the information related to the previous learning processing can include the learning setting in which the learning processing is previously performed. The first example is now described.

In one example, in the first example, the search processing unit 223 can search for a learning setting in which learning processing is previously performed using a data set having a higher degree of similarity with a data set specified by the user than a predetermined degree of similarity from the search history. The transmission control unit 224 can control transmission of the learning setting acquired by the search processing unit 223 to the information processing device 10. In this event, the data acquisition unit 123 can acquire the learning setting received from the information providing device 20 as the learning setting to be recommended. Here, the calculation of the degree of similarity between data sets can be performed in any way.

Figure 6:
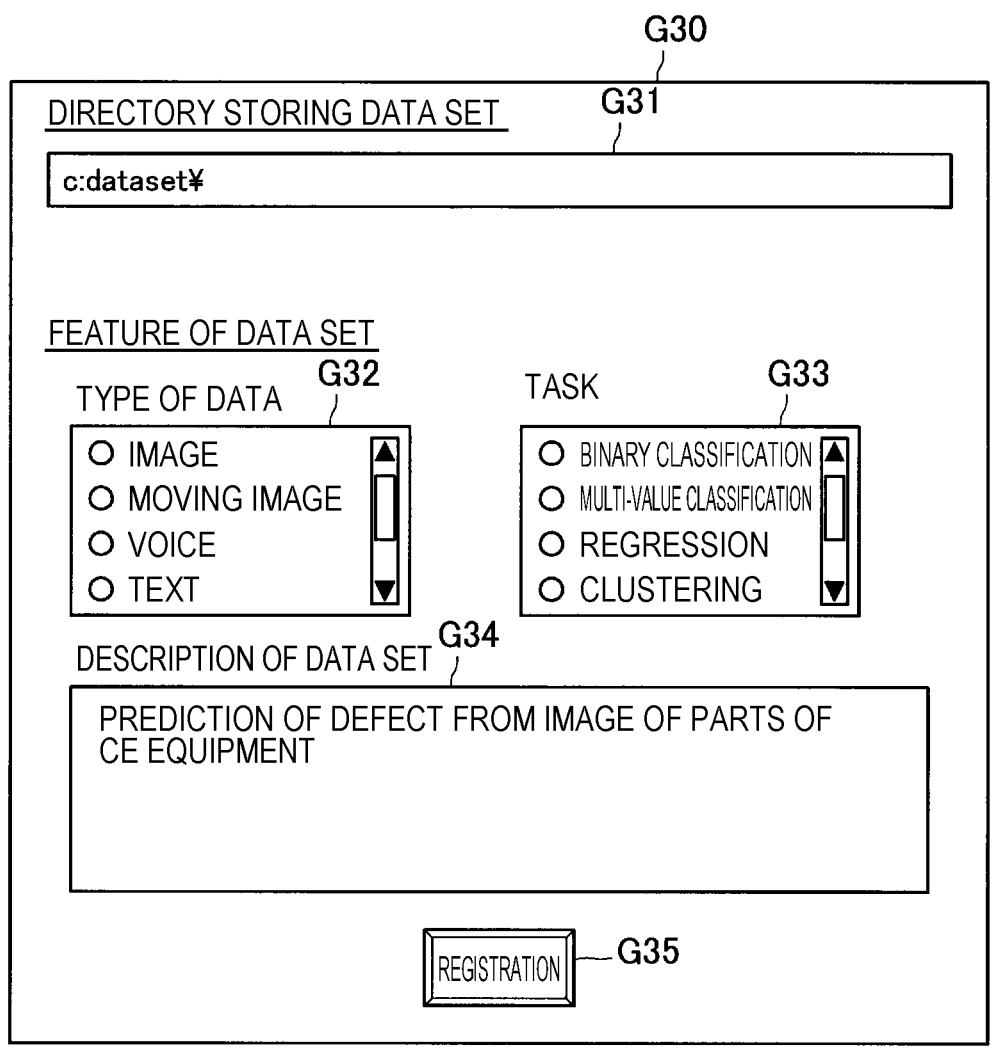
FIG. 6 is a diagram illustrating an example of a data set registration screen.

In one example, the degree of similarity between data sets can be calculated on the basis of the degree of similarity between feature information of data sets, on the basis of the degree of similarity between statistics of data sets, or on the basis of the both (e.g., it can be calculated using the sum of both). In one example, the feature information and the statistics of the data sets can be registered in the data set database 260 together with the data set. FIG. 6 is a diagram illustrating an example of a data set registration screen.

As illustrated in FIG. 6, a data set registration screen G30 whose display is controlled by the display control unit 124 includes a directory G31 in which the data set is stored, the feature information of the data set (a data type G32, a task G33, and a data set description G34 in the example illustrated in FIG. 6), and a registration button G35.

It is assumed that the directory G31 that stores the data set is specified by the user, one of items of the data type G32 is selected, any one of the items of the task G33 is selected, a free description is performed in the data set description G34, and the registration button G35 is selected. In such a case, the learning processing unit 222 calculates the statistics (e.g., number of learning samples, average value of the sizes of images included in the learning data, deviation value of a label, etc.) of the data set. The statistics of the data set, the feature information of the data set, and the data set are registered in the data set database 260.

The degree of similarity between pieces of the feature information of the data set can be calculated in any way (the degree of similarity between the statistics of the data set can also be calculated in a similar way to the degree of similarity between pieces of the feature information of the data set). In one example, the degree of similarity between pieces of the feature information of the data set can be represented with a discrete value. In this event, if the feature information of the data set coincides with each other, the degree of similarity between pieces of the feature information of the data set can be "1: similar". If the feature information of the data set does not coincide with each other, the degree of similarity between pieces of the feature information of the data set can be "0: dissimilar".

Alternatively, the degree of similarity between pieces of the feature information of the data set can be represented with a continuous value. In this event, the degree of similarity between pieces of the feature information of the data set can be represented with "exp(-(Euclidean distance))" using the Euclidean distance between pieces of the feature information of the data set. Alternatively, in a case where the feature information of the data set is text information, the degree of similarity between pieces of the feature information of the data set can be represented with cosine similarity of the bag-of-words vector transformed from the text.

Further, data other than the degree of similarity between the data sets can be additionally taken into consideration. In one example, the search processing unit 223 can acquire, as the learning setting to be recommended from the search history, a learning setting having a higher degree of accuracy than a predetermined degree of accuracy from among the learning settings related to the learning processing using the data set having a higher degree of similarity with the data set specified by the user than the predetermined degree of similarity. Then, the data acquisition unit 123 can acquire the learning setting received from the information providing device 20 as the learning setting to be recommended.

Further, it is also assumed that a plurality of learning settings are acquired by the search processing unit 223. In other words, there is a case where the data acquisition unit 123 can acquire the plurality of learning settings received from the information providing device 20 as a plurality of learning settings to be recommended. In such a case, the display control unit 124 can control display corresponding to the plurality of learning settings to be recommended in accordance with at least one of degrees of similarity and accuracy.

FIG. 7 is a diagram illustrating another example of the display screen of learning setting to be recommended. Referring to FIG. 7, a learning setting display screen G40 whose display is controlled by the display control unit 124 includes a network structure, a learning setting to be recommended, and a degree of similarity between data sets, as an example of the learning setting to be recommended. As illustrated in FIG. 7, the learning settings can be arranged in a predetermined direction (e.g., from top to bottom) in descending order of the degree of accuracy. In addition, as illustrated in FIG. 7, the learning settings can be arranged in a predetermined direction (e.g., from top to bottom) in descending order of the degree of similarity between data sets.

Moreover, the display of the learning setting to be recommended is selectable by the user. In a case where the display of the learning setting to be recommended is selected, the display control unit 124 can control display of details of the learning setting to be recommended (e.g., the learning setting display screen G10 illustrated in FIG. 5). Alternatively, in the case where the display of the learning setting to be recommended is selected, the display control unit 124 can control display of a learning setting search history tree (e.g., a learning setting search history tree display screen G50 illustrated in FIG. 9) including the learning setting to be recommended.

Subsequently, the second example is now described. As described above, in the second example, the information related to the learning processing includes the learning setting specified by the user, and the information related to the previous learning processing includes the learning setting in which the learning processing is previously performed.

In one example, in the second example, the search processing unit 223 can acquire a learning setting in which a degree of similarity with the learning setting specified by the user is higher than the predetermined degree of similarity from the search history. The transmission control unit 224 can control transmission of the learning setting acquired by the search processing unit 223 to the information processing device 10. In this event, the data acquisition unit 123 can acquire the learning setting received from the information providing device 20 as the learning setting to be recommended. Here, the calculation of the degree of similarity between learning settings can be performed in any way.

In one example, the degree of similarity between learning settings can be calculated using the sum of degrees of similarity between elements that correspond to each other in two learning settings. The degree of similarity between elements can be calculated in a case where the type of information included in the elements coincides with each other (e.g., the type of information included in the optimization algorithm is the value of the learning algorithm and the value of a hyperparameter). The calculation of the degree of similarity between elements can be performed in a similar way to the calculation of the degree of similarity between data sets. The degree of similarity between graph structures in the network structure can be calculated by using the graph kernel method described in the following reference.

(Literature cited) Hisaji Kashima: "Kernel Methods for Analyzing Structured. Data", Technical Report of IEICE. Pattern Recognition and Media. Understanding (PRMU), Vol. 104, No. 670, pp. 61-66, 2005-02-18.

Further, data other than the degree of similarity between learning settings can be additionally taken into consideration. In one example, the search processing unit 223 can acquire, as the learning setting to be recommended from the search history, a learning setting having a higher degree of similarity with the learning setting specified by the user than a predetermined degree of similarity and having a higher degree of accuracy than the learning setting specified by the user. Then, the data acquisition unit can acquire the learning setting received from the information providing device 20 as the learning setting to be recommended.

Alternatively, the search processing unit 223 can acquire, as the learning setting to be recommended, a learning setting having a higher degree of similarity with the learning setting specified by the user than the predetermined degree of similarity and having the highest frequency of appearance in the learning setting search history database 270. Then, the data acquisition unit can acquire the learning setting received from the information providing device 20 as the learning setting to be recommended.

Further, both the degree of accuracy and the frequency can be considered. In one example, the search processing unit 223 can acquire, as the learning setting to be recommended, a learning setting having a higher degree of similarity with the learning setting specified by the user than the predetermined degree of similarity and corresponding to the degree of accuracy and the frequency of appearance in the learning setting search history database 270 (e.g., the learning setting that maximizes the product of the degree of accuracy and the frequency of appearance in the learning setting search history database 270). Then, the data acquisition unit can acquire the learning setting received from the information providing device 20 as the learning setting to be recommended.

The display control unit 124 can control display of the learning setting to be recommended. In one example, the display control unit 124 can control display of the learning setting display screen G10 as illustrated in FIG. 5. Alternatively, the display control unit 124 can control display of a difference between the learning setting specified by the user and the learning setting to be recommended. Moreover, the case of displaying the difference may be limited to a case where the degree of similarity between the learning settings is higher than the predetermined degree of similarity.

Figure 8:
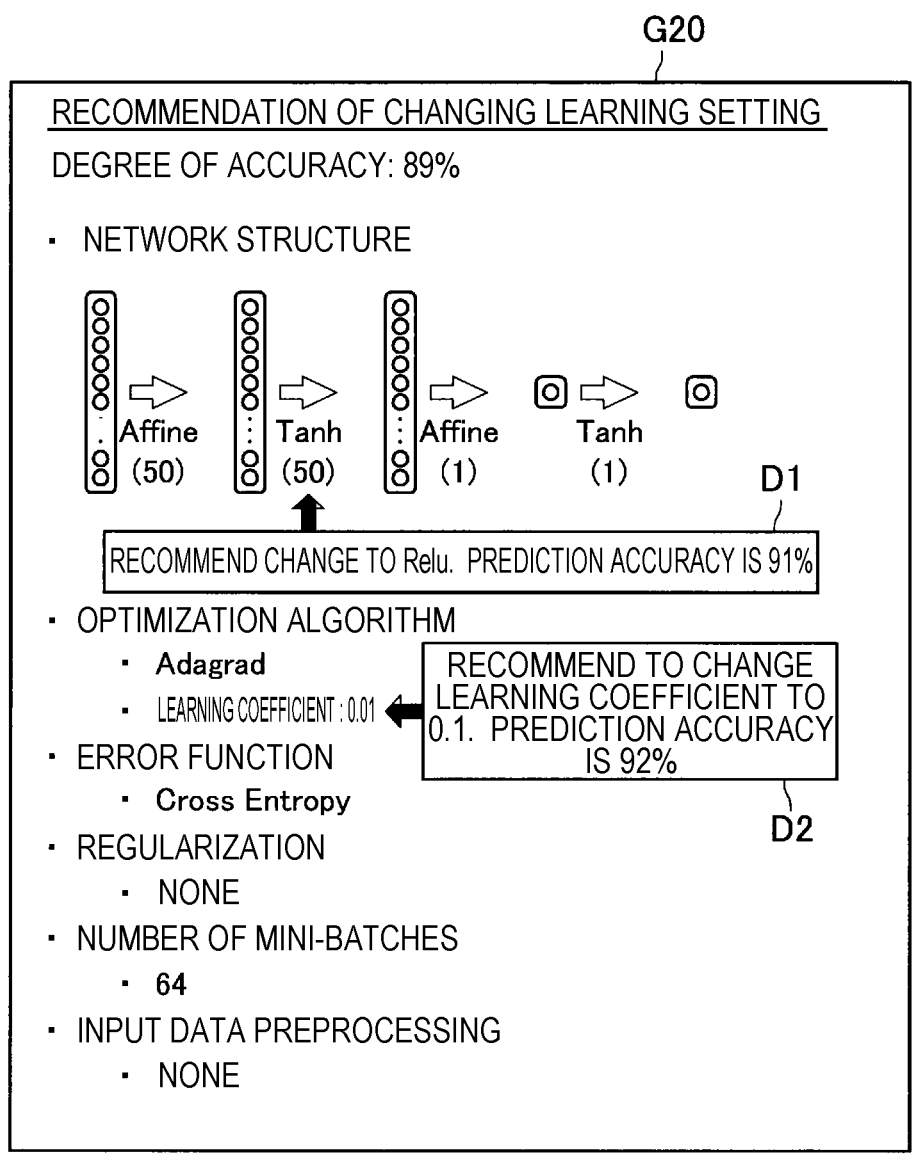
FIG. 8 is a diagram illustrating yet another example of the display screen of learning setting to be recommended.

FIG. 8 is a diagram illustrating another example of the display screen of learning setting to be recommended. Referring to FIG. 8, the change of "Tan h layer" included in the learning setting specified by the user to "Relu layer" is displayed as a difference D1 on the learning setting display screen G20 whose display is controlled by the display control unit 124. In addition, the change of the learning coefficient included in the learning setting specified by the user to "0.1" is displayed as a difference D2 on the learning setting display screen G20.

The prediction accuracy is displayed on the learning setting display screen (320 for each difference. The prediction accuracy is calculated by calculating an average value of the increase of the previous accuracy in the recommended change and applying the average value to the degree of accuracy of the learning setting specified by the user. In addition, the user can specify the learning setting element to be recommended. In this case, change of only the specified element can be recommended.

Moreover, the display of the recommended change (difference D1 or difference D2) is selectable by the user. In a case of selecting the recommended change, the display control unit 124 can control display of the details of the learning setting to be recommended (e.g., the learning setting display screen G10 illustrated in FIG. 5). Alternatively, in the case of selecting the display of the recommended change, the display control unit 124 can control display of the learning setting search history tree (e.g., the learning setting search history tree display screen G50 illustrated in FIG. 9) including the learning setting to be recommended.

Figure 9:
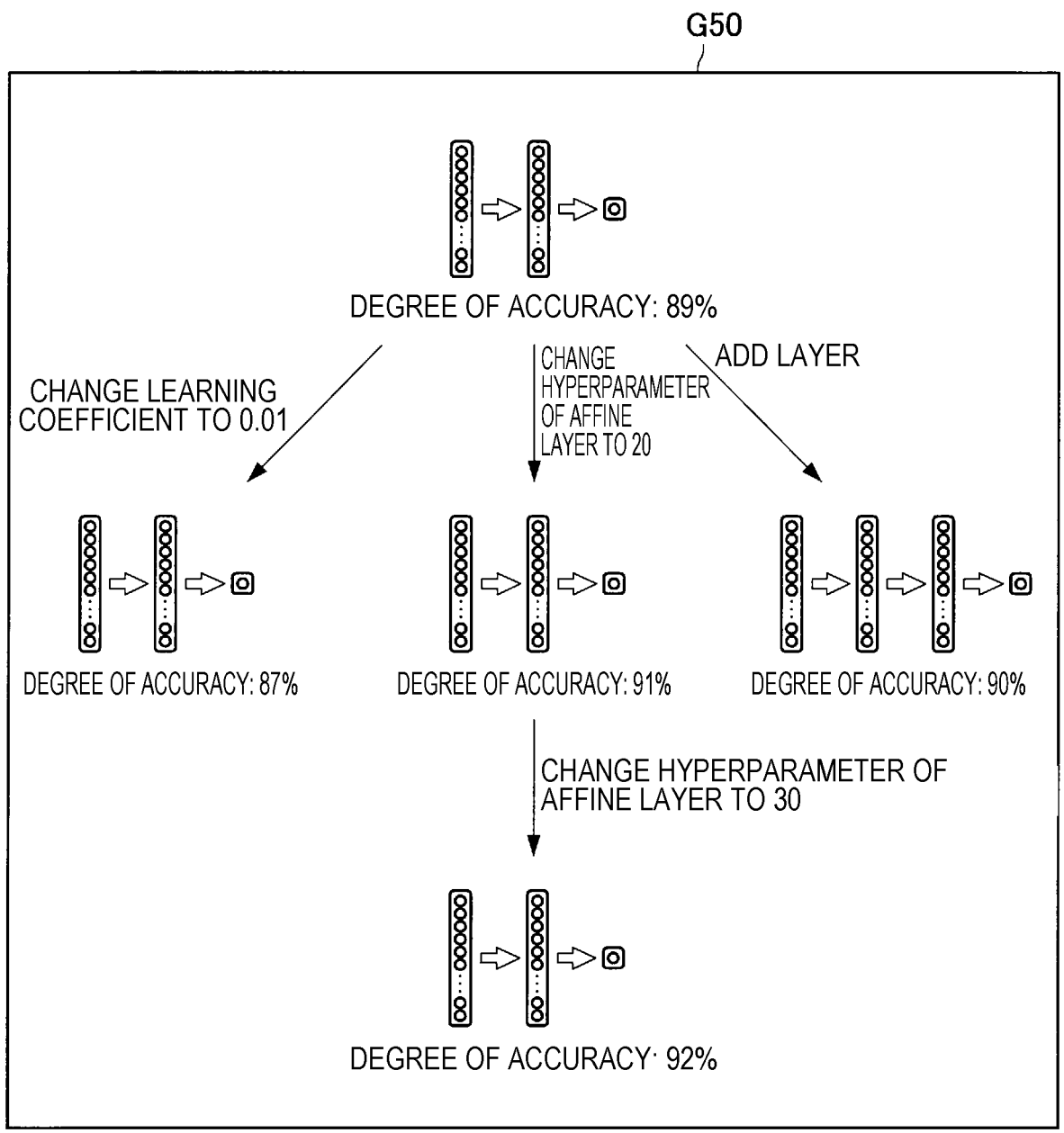
FIG. 9 is a diagram illustrating an example of a learning setting search history tree display screen.

The above description is given of the example in which the learning setting to be recommended is displayed. However, the display control unit 124 can control display of the learning setting search history tree including the learning setting to be recommended. FIG. 9 is a diagram illustrating an example of the learning setting search history tree display screen. As illustrated in FIG. 9, the display control unit 124 is capable of controlling display of the learning setting search history tree display screen G50 as the learning setting search history tree including the learning setting to be recommended.

The above description is given of the example in which the learning setting to be recommended is acquired on the basis of the degree of similarity between the data sets and the degree of similarity between the learning settings. However, the learning setting to be recommended can be acquired on the basis of the degree of similarity between the learning setting search history trees. In other words, the search processing unit 223 acquires the learning setting having the highest degree of accuracy from the previous learning setting search history tree in which the degree of similarity with the learning setting search history tree executed on the basis of the operation by the user is higher than the predetermined degree of similarity. Then, the data acquisition unit 123 can acquire the learning setting received from the information providing device 20 as the learning setting to be recommended.

The degree of similarity between the learning setting search history trees can be calculated in any way. In one example, the degree of similarity between the learning setting search history trees can be calculated using the sum of the degrees of similarity between the learning settings that correspond to each other in the two learning setting search history trees. The calculation of a degree of similarity between learning settings is the same as that described above.

Moreover, the above description is given of the example in which the degree of similarity of the similarity calculation target is calculated using the sum of degrees of similarity between elements that correspond to each other included in the similarity degree calculation target. However, the influence of each element may be taken into consideration. In other words, a weight scalar value is assigned to each element, and the degree of similarity of the similarity degree calculation target is calculated by a weighted sum of degrees of similarity between elements that correspond to each other included in the similarity degree calculation target.

When the learning setting to be recommended is displayed, the user is able to execute the learning processing using the learning setting to be recommended. In one example, a part selected from the learning settings to be recommended can be used for execution of the learning processing, or a combination of the plurality of learning settings to be recommended can be used. In addition, a parameter included in the learning setting to be recommended can be used as an initial value.

Next, a method of accessing the search history on the basis of a group and information related to the user's friend is described. This cloud service allows the group and the user's friend to be registered. The group can be created by the user, and the user who created it becomes a host of the group. The host can invite other users to the group and can determine a user belonging to a group.

The learning setting search history tree is referred to in the above description, but some users may not want to disclose their own learning setting search history trees to all other members. In this case, the user performs an operation of specifying the disclosure range of the learning setting search history tree. When such an operation is acquired by the operation acquisition unit 121, the search processing unit 223 discloses the user's learning setting search history tree only to other users belonging to the group to which the user belongs. This makes it possible the access right to the learning setting search history tree to be controlled.

Likewise, it is possible for the user to make only the user who is registered as a friend accessible its own learning setting search history tree. In addition, it is also possible for the user to perform the setting, such as disclosing a part of its own learning setting search history tree, disclosing a part of it to only the group, and not disclosing a part to other users.

1.4. Hardware Configuration Example

Figure 10:
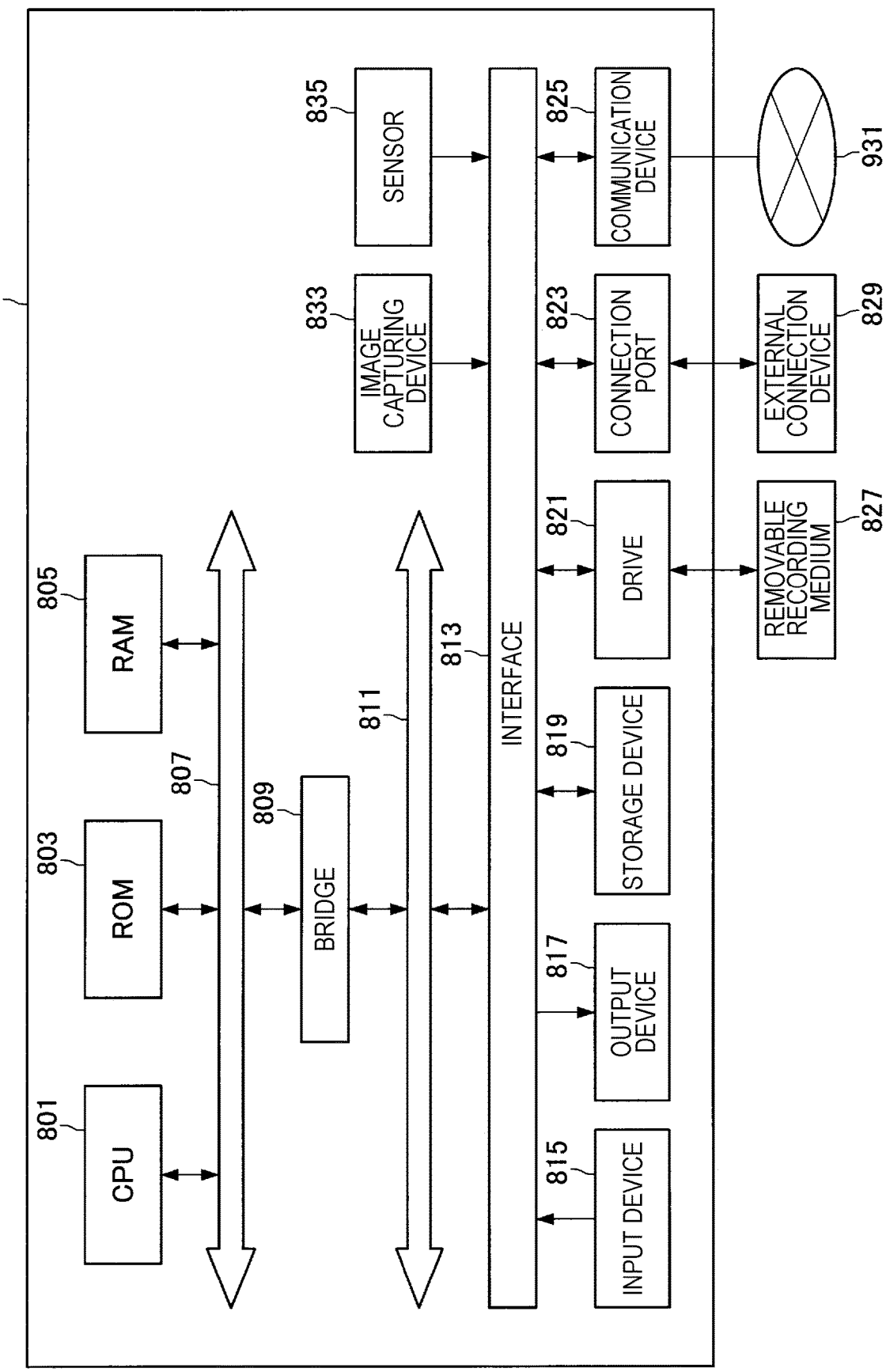
FIG. 10 illustrates a hardware configuration of the information processing device.

Next, the hardware configuration of the information processing device 10 according to an embodiment of the present disclosure is described with reference to FIG. 10. FIG. 10 is a block diagram illustrating a hardware configuration example of the information processing device 10 according to an embodiment of the present disclosure.

As illustrated in FIG. 10, the information processing device 10 includes a central processing unit (CPU) 801, a read-only memory (ROM) 803, and a random-access memory (RAM) 805. In addition, the information processing device 10 may include a host bus 807, a bridge 809, an external bus 811, an interface 813, an input device 815, an output device 817, a storage device 819, a drive 821, a connection port 823, and a communication device 825. The information processing device 10 may further include an image capturing device 833 and a sensor 835 as necessary. In conjunction with, or in place of, the CPU 801, the information processing device 10 may have a processing circuit called a digital signal processor (DSP) or application specific integrated circuit (ASIC).

The CPU 801 functions as an arithmetic processing unit and a control unit, and controls the whole operation in the information processing device 10 or a part thereof in accordance with various programs recorded in the ROM 803, the RAM 805, the storage device 819, or a removable recording medium 827. The ROM 803 stores programs, operation parameters, or the like used by the CPU 801. The RAM 805 temporarily stores programs used in the execution by the CPU 801, parameters that vary as appropriate in the execution, or the like. The CPU 801, the ROM 803, and the RAM 805 are connected with each other via the host bus 807 that includes an internal bus such as a CPU bus. Furthermore, the host bus 807 is connected to the external bus 811 such as peripheral component interconnect/interface (PCI) bus via the bridge 809.

The input device 815 is, in one example, a device operated by a user, such as a mouse, a keyboard, a touch panel, a button, a switch, and a lever. The input device 815 may include a microphone for detecting user's speech. The input device 815 may be, in one example, a remote control device using infrared rays or other radio waves, or may be an external connection device 829 such as a cellular phone that supports the operation of the information processing device 10. The input device 815 includes an input control circuit that generates an input signal on the basis of the information input by the user and outputs it to the CPU 801. The user operates the input device 815 to input various data to the information processing device 10 and to instruct the information processing device 10 to perform a processing operation. In addition, the image capturing device 833, which will be described later, can also function as an input device by capturing the motion of the user's hand, user's finger, or the like. In this case, the pointing position may be determined depending on the motion of the hand or the direction of the finger.

The output device 817 includes a device capable of notifying visually or audibly the user of the acquired information. The output device 817 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 817 outputs the result obtained by the processing of the information processing device 10 as a video such as a text or an image, or outputs it as audio such as a speech or sound. In addition, the output device 817 may include, in one example, a light for lighting up the surroundings.

The storage device 819 is a data storage device configured as an example of a storage portion of the information processing device 10. The storage device 819 includes, in one example, a magnetic storage unit device such as hard disk drive (HDD), a semiconductor storage device, an optical storage device, and a magneto-optical storage device. The storage device 819 stores programs executed by the CPU 801, various data, various types of data obtained from the outside, and the like.

The drive 821 is a reader-writer for a removable recording medium 827 such as a magnetic disk, an optical disk, a magneto-optical disk, and a semiconductor memory, and is incorporated in the information processing device 10 or externally attached thereto. The drive 821 reads the information recorded on the loaded removable recording medium 827 and outputs it to the RAM 805. In addition, the drive 821 writes a record in the loaded removable recording medium 827.

The connection port 823 is a port for directly connecting the device to the information processing device 10. The connection port 823 may be, in one example, a universal serial bus (USB) port, an IEEE 1394 port, or a small computer device interface (SCSI) port. In addition, the connection port 823 may be, in one example, an RS-232C port, an optical audio terminal, or high-definition multimedia interface (HDMI, registered trademark) port. The connection of the external connection device 829 to the connection port 823 makes it possible to exchange various kinds of data between the information processing device 10 and the external connection device 829.

The communication device 825 is, in one example, a communication interface including a communication device or the like, which is used to be connected to the communication network 931. The communication device 825 may be, in one example, a communication card for wired or wireless local area network (LAN), Bluetooth (registered trademark), or wireless USB (WUSB). In addition, the communication device 825 may be, in one example, a router for optical communication, a router for asymmetric digital subscriber line (ADSL), or a modem for various communications. The communication device 825 transmits and receives signals or the like using a predetermined protocol such as TCP/IP, in one example, with the Internet or other communication devices. In addition, the communication network 931 connected to the communication device 825 is a network connected by wire or wireless, and is, in one example, the Internet, home LAN, infrared communication, radio wave communication, satellite communication, or the like.

The image capturing device 833 is a device that captures a real space and generates a captured image, b using an image sensor such as charge-coupled device (CCD) or complementary-metal-oxide semiconductor (CMOS) and various members such as a lens for controlling imaging of a subject image on the image sensor. The image capturing device 833 can capture a still image or a moving image.

The sensor 835 is, in one example, various sensors such as an acceleration sensor, a gyro sensor, a geomagnetic sensor, an optical sensor, and a sound sensor. The sensor 835 acquires information related to the state of the information processing device 10 such as the attitude of the casing of the information processing device 10, and acquires information related to the surrounding environment of the information processing device 10 such as brightness or noise around the information processing device 10. The sensor 835 may also include a GPS sensor that receives global positioning system (GPS) signals and measures the latitude, longitude, and altitude of the device.

Figure 11:
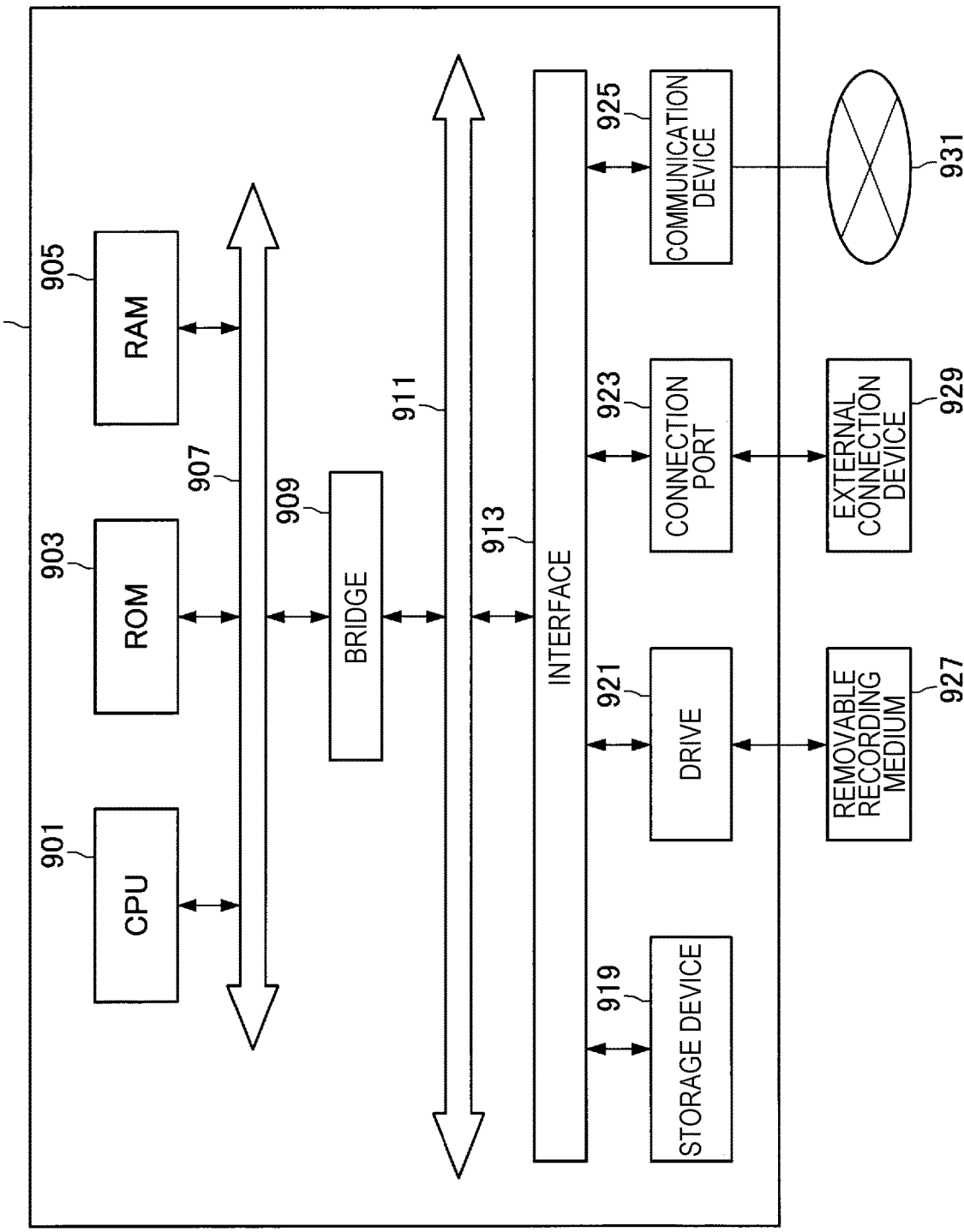
FIG. 11 illustrates a hardware configuration of the information providing device.

Next, the hardware configuration of the information providing device 20 according to an embodiment of the present disclosure is described with reference to FIG. 11. FIG. 11 is a block diagram illustrating a hardware configuration example of the information providing device 20 according to an embodiment of the present disclosure.

As illustrated in FIG. 11, the information providing device 20 includes a central processing unit (CPU) 901, a read-only memory (ROM) 903, and a random-access memory (RAM) 905. In addition, the information providing device 20 may include a host bus 907, a bridge 909, an external bus 911, an interface 913, a storage device 919, a drive 921, a connection port 923, and a communication device 925. In conjunction with, or in place of, the CPU 901, the information processing device 10 may have a processing circuit called a digital signal processor (DSP) or application specific integrated circuit (ASIC).

The CPU 901 functions as an arithmetic processing unit and a control unit, and controls the whole operation in the information providing device 20 or a part thereof in accordance with various programs recorded in the ROM 903, the RAM 905, the storage device 919, or a removable recording medium 927. The ROM 903 stores programs, operation parameters, or the like used by the CPU 901. The RAM 905 temporarily stores programs used in the execution by the CPU 901, parameters that vary as appropriate in the execution, or the like. The CPU 901, the ROM 903, and the RAM 905 are connected with each other via the host bus 907 that includes an internal bus such as a CPU bus. Furthermore, the host bus 907 is connected to the external bus 911 such as peripheral component interconnect/interface (PCI) bus via the bridge 909.

The storage device 919 is a data storage device configured as an example of a storage portion of the information providing device 20. The storage device 919 includes, in one example, a magnetic storage unit device such as hard disk drive (HDD), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information providing device 20 or externally attached thereto. The drive 921 reads the information recorded on the loaded removable recording medium 927 and outputs it to the RAM 905. In addition, the drive 921 writes a record in the loaded removable recording medium 927.

The connection port 923 is a port for directly connecting the device to the information providing device 20. The connection port 923 may be, in one example, a universal serial bus (USB) port, an IEEE 1394 port, or a small computer system interface (SCSI) port. In addition, the connection port 923 may be, in one example, an RS-232C port, an optical audio terminal, or high-definition multimedia interface (HDMI, registered trademark) port. The connection of the external connection device 929 to the connection port 923 makes it possible to exchange various kinds of data between the information providing device 20 and the external connection device 929.

The communication device 925 is, in one example, a communication interface including a communication device or the like, which is used to be connected to a communication network 931. The communication device 925 may be, in one example, a communication card for wired or wireless local area network (LAN), Bluetooth (registered trademark), or wireless USB (WUSB). In addition, the communication device 925 may be, in one example, a router for optical communication, a router for asymmetric digital subscriber line (ADSL), or a modem for various communications. The communication device 925 transmits and receives signals or the like using a predetermined protocol such as TCP/IP, in one example, with the Internet or other communication devices. In addition, the communication network 931 connected to the communication device 925 is a network connected by wire or wireless, and is, in one example, the Internet, home LAN, infrared communication, radio wave communication, satellite communication, or the like.

2. CONCLUSION

As described above, the embodiment of the present disclosure provides the information processing device including the data acquisition unit configured to acquire the learning setting corresponding to the degree of similarity between the information related to the learning processing specified by the user and the search history in the previous learning processing as the learning setting to be recommended to the user, and the display control unit configured to control display corresponding to the learning setting to be recommended.

Such a configuration makes it possible to reduce the time taken for selection of the learning setting. In addition, according to an embodiment of the present disclosure, a high-performance learning setting is automatically determined.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the positions of the respective components are not particularly limited as long as the operation of the information processing system 1 described above is performed. In one example, the above description is given of the example in which the information providing device 20 includes the learning processing unit 222, the data set database 260, and the learning setting search history database 270. However, part or all of the learning processing unit 222, the data set database 260, and the learning setting search history database 270 may be provided in the information processing device 10.

In one example, when the learning processing unit 222, the data set database 260, and the learning setting search history database 270 are provided in the information processing device 10, the information processing system 1 does not necessarily include the information providing device 20.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a data acquisition unit configured to acquire a learning setting corresponding to information related to previous learning processing in which a degree of similarity with information related to learning processing specified by a user is higher than a predetermined degree of similarity as a learning setting to be recommended to the user; and a display control unit configured to control display corresponding to the learning setting to be recommended.

(2)

The information processing device according to (1), in which the data acquisition unit acquires performance of the learning setting to be recommended, and the display control unit controls display of the performance.

(3)

The information processing device according to (1) or (2), in which the information related to the learning processing specified by the user includes a data set specified by the user, and the information related to the previous learning processing includes a data set used for the previous learning processing.

(4)

The information processing device according to (3), in which the data acquisition unit acquires, as the learning setting to be recommended, a learning setting in which learning processing is previously performed using a data set having a higher degree of similarity with the data set specified by the user than a predetermined degree of similarity.

(5)

The information processing device according to (4), in which the data acquisition unit acquires, as the learning setting to be recommended, a learning setting having performance higher than predetermined performance among the learning settings in which the learning processing is previously performed using the data set having the higher degree of similarity with the data set specified by the user than the predetermined degree of similarity.

(6)

The information processing device according to (4) or (5), in which the display control unit, in a case where a plurality of the learning settings to be recommended are acquired by the data acquisition unit, controls display corresponding to the plurality of learning settings to be recommended in accordance with at least one of the degree of similarity and performance.

(7)

The information processing device according to any one of (4) to (6), in which the degree of similarity is calculated on a basis of a degree of similarity of at least one of feature information and statistics between data sets.

(8)

The information processing device according to any one of (4) to (7), in which the display control unit controls display of the degree of similarity.

(9)

The information processing device according to (1) or (2), in which the information related to the learning processing includes a learning setting specified by the user, and the information related to the previous learning processing includes a learning setting in which learning processing is previously performed.

(10)

The information processing device according to (9), in which the data acquisition unit acquires, as the learning setting to be recommended, a learning setting having a higher degree of similarity with the learning setting specified by the user than a predetermined degree of similarity.

(11)

The information processing device according to (9) or (10), in which the data acquisition unit acquires, as the learning sating to be recommended, a learning setting having a higher degree of similarity with the learning setting specified by the user than a predetermined degree of similarity and having higher performance than the learning setting specified by the user.

(12)

The information processing device according to (9) or (10), in which the data acquisition unit acquires, as the learning setting to be recommended, a learning setting having a higher degree of similarity with the learning setting specified by the user than a predetermined degree of similarity and having highest frequency of appearance in a learning setting search history.

(13)

The information processing device according to (9) or (10), in which the data acquisition unit acquires, as the learning setting to be recommended, a learning setting having a higher degree of similarity with the learning setting specified by the user than a predetermined degree of similarity and corresponding to performance and frequency of appearance in a learning setting search history.

(14)

The information processing device according to any one of (9) to (13), in which the display control unit controls display of the learning setting to be recommended or display of a difference between the learning setting specified by the user and the learning setting to be recommended.

(15)

The information processing device according to 14), in which in a case where the display of the learning setting to be recommended or the display of the difference is selected by the user, the display control unit controls display of a learning setting search history tree including the learning setting to be recommended or details of the learning setting to be recommended.

(16)

The information processing device according to any one of (1) to (15), in which the display control unit controls display of a learning setting search history tree including the learning setting to be recommended.

(17)

The information processing device according to (1), in which the data acquisition unit acquires a learning setting having highest performance from a previous learning setting search history tree in which a degree of similarity with a learning setting search history tree executed on a basis of an operation by the user is higher than a predetermined degree of similarity.

(18)

The information processing device according to (1), including:

an operation acquisition unit configured to acquire an operation for specifying a disclosure range of a learning setting search history executed on a basis of an operation by the user.

(19)

A method of processing information, the method including:

acquiring a learning setting corresponding to information related to previous learning processing in which a degree of similarity with information related to learning processing specified by a user is higher than a predetermined degree of similarity as a learning setting to be recommended to the user; and controlling, by a processor, display corresponding to the learning setting to be recommended.

(20)

A method of providing information, the method including:

searching for a learning setting corresponding to information related to previous learning processing in which a degree of similarity with information related to learning processing specified by a user is higher than a predetermined degree of similarity as a learning setting to be recommended to the user; and controlling, by a processor, transmission of the learning setting to be recommended.

REFERENCE SIGNS LIST 1 information processing system
10 information processing device
110 operation unit
120 control unit
121 operation acquisition unit
122 transmission control unit
123 data acquisition unit
124 display control unit
130 communication unit
140 storage unit
150 display unit
20 information providing device
220 control unit
221 acquisition unit
222 learning processing unit
223 search processing unit
224 transmission control unit
230 communication unit
240 storage unit
260 data set database
262 data set
270 learning setting search history database
272 learning setting
273 degree of accuracy
280 user database

The invention claimed is:

1. An information processing device comprising:

a data acquisition unit configured to acquire a learning setting corresponding to information related to previous learning processing, based on a degree of similarity between the information related to the previous learning processing and information related to learning processing specified by a user being higher than a predetermined degree of similarity, as a learning setting to be recommended to the user; and a display control unit configured to control display corresponding to the learning setting to be recommended, wherein the information related to the learning processing includes a learning setting specified by the user, wherein the display control unit is further configured to determine whether or not to display a difference between the learning setting specified by the user and the learning setting to be recommended, based on the degree of similarity between the learning setting specified by the user and the learning setting to be recommended being higher than the predetermined degree of similarity, wherein the display control unit is further configured to limit display of the difference between the learning setting specified by the user and the learning setting to be recommended, based on the degree of similarity between the learning setting specified by the user and the learning setting to be recommended being lower than the predetermined degree of similarity, and wherein the data acquisition unit and the display control unit are each implemented via at least one processor.

2. The information processing device according to claim 1, wherein the data acquisition unit is further configured to acquire performance of the learning setting to be recommended, and the display control unit is further configured to control display of the performance.

3. The information processing device according to claim 1, wherein the information related to the learning processing specified by the user includes a data set specified by the user, and the information related to the previous learning processing includes a data set used for the previous learning processing.

4. The information processing device according to claim 3, wherein the data acquisition unit is further configured to acquire, as the learning setting to be recommended, a learning setting in which learning processing is previously performed using a data set having a higher degree of similarity with the data set specified by the user than a predetermined degree of similarity.

5. The information processing device according to claim 4, wherein the data acquisition unit is further configured to acquire, as the learning setting to be recommended, a learning setting having performance higher than predetermined performance among learning settings in which the learning processing is previously performed using the data set having the higher degree of similarity with the data set specified by the user than the predetermined degree of similarity.

6. The information processing device according to claim 4,
wherein the display control unit, in a case where a plurality of the learning settings to be recommended are acquired by the data acquisition unit, is further configured to control display corresponding to the plurality of learning settings to be recommended in accordance with at least one of the degree of similarity and performance.

7. The information processing device according to claim 4,
wherein the degree of similarity is calculated on a basis of a degree of similarity of at least one of feature information and statistics between data sets.

8. The information processing device according to claim 4,
wherein the display control unit is further configured to control display of the degree of similarity.

9. The information processing device according to claim 1,
wherein
the information related to the previous learning processing includes a learning setting in which learning processing is previously performed.

10. The information processing device according to claim 9,
wherein the data acquisition unit is further configured to acquire, as the learning setting to be recommended, a learning setting having a higher degree of similarity with the learning setting specified by the user than a predetermined degree of similarity.

11. The information processing device according to claim 9,
wherein the data acquisition unit is further configured to acquire, as the learning setting to be recommended, a learning setting having a higher degree of similarity with the learning setting specified by the user than a predetermined degree of similarity and having higher performance than the learning setting specified by the user.

12. The information processing device according to claim 9,
wherein the data acquisition unit is further configured to acquire, as the learning setting to be recommended, a learning setting having a higher degree of similarity with the learning setting specified by the user than a predetermined degree of similarity and having highest frequency of appearance in a learning setting search history.

13. The information processing device according to claim 9,
wherein the data acquisition unit is further configured to acquire, as the learning setting to be recommended, a learning setting having a higher degree of similarity with the learning setting specified by the user than a predetermined degree of similarity and corresponding to performance and frequency of appearance in a learning setting search history.

14. The information processing device according to claim 9,
wherein the display control unit is further configured to control display of the learning setting to be recommended.

15. The information processing device according to claim 14,
wherein in a case where the display of the learning setting to be recommended or the display of the difference is selected by the user, the display control unit is further configured to control display of a learning setting search history tree including the learning setting to be recommended or details of the learning setting to be recommended.

16. The information processing device according to claim 1,
wherein the display control unit is further configured to control display of a learning setting search history tree including the learning setting to be recommended.

17. The information processing device according to claim 1,
wherein the data acquisition unit is further configured to acquire a learning setting having highest performance from a previous learning setting search history tree in which a degree of similarity with a learning setting search history tree executed on a basis of an operation by the user is higher than a predetermined degree of similarity.

18. The information processing device according to claim 1, further comprising:
an operation acquisition unit configured to acquire an operation for specifying a disclosure range of a learning setting search history executed on a basis of an operation by the user,
wherein the operation acquisition unit is implemented via at least one processor.

19. A method of processing information, the method comprising:
acquiring a learning setting corresponding to information related to previous learning processing, based on a degree of similarity between the information related to the previous learning processing and information related to learning processing specified by a user being higher than a predetermined degree of similarity, as a learning setting to be recommended to the user, wherein the information related to the learning processing includes a learning setting specified by the user;
controlling, by a processor, display corresponding to the learning setting to be recommended;
determining, by the processor, whether or not to display a difference between the learning setting specified by the user and the learning setting to be recommended, based on the degree of similarity between the learning setting specified by the user and the learning setting to be recommended being higher than the predetermined degree of similarity; and
limiting display of the difference between the learning setting specified by the user and the learning setting to be recommended, based on the degree of similarity between the learning setting specified by the user and the learning setting to be recommended being lower than the predetermined degree of similarity.

20. A method of providing information, the method comprising:
searching for a learning setting corresponding to information related to previous learning processing, based on a degree of similarity between the information related to the previous learning processing and information related to learning processing specified by a user that is being higher than a predetermined degree of similarity, as a learning setting to be recommended to the user, wherein the information related to the learning processing includes a learning setting specified by the user; and controlling, by a processor, transmission of the learning setting to be recommended, wherein whether or not a difference between the learning setting specified by the user and the learning setting to be recommended is determined to be displayed based on the degree of similarity between the learning setting specified by the user and the learning setting to be recommended being higher than the predetermined degree of similarity, and wherein display of the difference between the learning setting specified by the user and the learning setting to be recommended is limited, based on the degree of similarity between the learning setting specified by the user and the learning setting to be recommended being lower than the predetermined degree of similarity.

21. The information processing device according to claim 1, wherein the previous learning processing is performed by selecting a data set and the learning setting corresponding to the information related to the previous learning processing and executing a parameter optimization algorithm for the data set and the learning setting corresponding to the information related to the previous learning processing, and wherein the learning processing specified by the user is performed by selecting a data set specified by the user and learning setting corresponding to the learning specified by the user and executing the parameter optimization algorithm for the data set specified by the user and the learning setting specified by the user.

\* \* \* \* \*